United States Patent
Hamburg et al.

[11] Patent Number: 6,161,531
[45] Date of Patent: Dec. 19, 2000

[54] ENGINE CONTROL SYSTEM WITH ADAPTIVE COLD-START AIR/FUEL RATIO CONTROL

[75] Inventors: Douglas Ray Hamburg, Bloomfield Hills; Daniel Lawrence Meyer; William Earl Leisenring, both of Dearborn, all of Mich.

[73] Assignee: Ford Motor Company, Dearborn, Mich.

[21] Appl. No.: 09/396,050

[22] Filed: Sep. 15, 1999

[51] Int. Cl.$^7$ .................................................. F02D 41/06
[52] U.S. Cl. ............................................ 123/674; 701/109
[58] Field of Search ........................... 123/674; 701/103, 701/104, 109

[56] References Cited

U.S. PATENT DOCUMENTS

| | | | |
|---|---|---|---|
| 4,307,450 | 12/1981 | Carp et al. | 123/489 |
| 5,361,582 | 11/1994 | Uchida et al. | 123/674 |
| 5,483,946 | 1/1996 | Hamburg et al. | |
| 5,928,303 | 7/1999 | Sakai | 701/109 |
| 5,950,606 | 9/1999 | Iida et al. | 123/674 |

*Primary Examiner*—Erick Solis
*Attorney, Agent, or Firm*—Allan J. Lippa

[57] ABSTRACT

Air/fuel and ignition control of engine are used to more rapidly heat-up a catalytic converter. A control system generates a fuel command for fuel delivery to the engine based upon at least an amount of air inducted into the engine. The fuel command is corrected by a correction value so that the exhaust gas mixture is shifted more closely to the preselected air/fuel ratio. Correction values are adaptively learned during warm engine operation from a feedback signal derived from an exhaust gas oxygen sensor. Initial warm correction values are stored in a reference table. At engine shut-off the difference between the warm correction values and the reference table are stored in an offset correction table. This offset correction table is then used during the next engine cold start to schedule the open-loop air/fuel ratio by using the cold adaptive table values which have been modified by the values stored in the corresponding cells of the offset correction value table. In this way, any changes which occur in engine operating characteristics from the time the engine initially warms up to the time it is shut off are represented by the offset correction table.

7 Claims, 5 Drawing Sheets

ENGINE CONTROL SYSTEM WITH ADAPTIVE COLD-START AIR/FUEL RATIO CONTROL

BACKGROUND OF THE INVENTION

The field of the invention relates to engine control systems, including air/fuel ratio control systems, which provide rapid warm-up of the catalytic converter.

U.S. Pat. No. 5,483,946 describes a system in which robust cold-start air/fuel ratio (A/F) control was accomplished by utilizing a "cold" adaptive A/F table to schedule A/F values during the open-loop period following any engine start in which the engine coolant temperature (ECT) is within a certain prescribed range. In that system, the cold adaptive A/F table is updated whenever the engine operates in closed-loop A/F operation while the ECT is in the prescribed range. Updating of the cold adaptive continues until the ECT exceeds a certain value. When this occurs, the engine reverts to normal A/F feedback control, although the "hot" adaptive table would not be updated until the engine had fully warmed up. Once the engine has warmed up, the hot adaptive table would be updated. If an engine start occurred when the ECT was below the prescribed temperature, the open-loop A/F at any rpm/load point would be scheduled based on an extrapolation of values in the cold and hot adaptive tables as a function of ECT. If an engine start occurred when the ECT was above the prescribed temperature but below the fully warmed up temperature, the base A/F at any rpm/load point would be scheduled based on an interpolation of values in the cold and hot adaptive tables as a function of ECT. The system described in U.S. Pat. No. 5,483,946 does not account for changes in operating characteristics during warmed up operation which may affect the cold adaptive table.

For example, the cold A/F adaptive table could produce erroneous A/F values if the vehicle was refueled with a different fuel after the cold adaptive table had been "programmed" for the next engine cold start. In particular, different fuels can produce different system characteristics which the A/F control strategy must learn and subsequently adapt for. This is an ongoing problem since there is a large variety of available fuels which consumers can arbitrarily select and switch between. Furthermore, these fuels can behave differently for both cold and hot running conditions. Thus, in this example, the next engine cold start would thus occur with a fuel having different characteristics than that represented by the cold adaptive table. Accordingly, there exists a need for a control strategy which adapts the A/F during both cold and hot engine operating conditions and, in particular, modifies the cold adaptive table in accordance with operating characteristics occurring during hot engine operation.

SUMMARY OF THE INVENTION

An object of the invention claimed herein is to provide an improved A/F control strategy. Another object of the invention is to rapidly warm the converter by A/F control while maintaining smooth engine operation, minimizing emissions, and providing engine power when demanded.

The problems of prior approaches are overcome, and the objects and advantages of the claimed invention are achieved, by providing a control method and system for an internal combustion engine having its exhaust coupled to a catalytic converter. In one aspect of the invention, the method comprises the steps of: generating a fuel command for delivering fuel to the engine based upon at least an amount of air inducted into the engine; detecting engine operation in a first region corresponding to a warmed-up engine state; adaptively learning a correction value upon entering said first region in response to a feedback variable derived from an exhaust gas oxygen sensor; storing said correction value as a reference correction value; thereafter continuously adaptively learning said correction value during operation in said first region in response to said feedback variable derived from said exhaust gas oxygen sensor; and, upon engine shut-off, storing the difference between said correction value and said reference correction value as an offset correction value. Thus, the offset correction value represents changes in engine operating characteristics from the time period between initial engine warm-up and engine shut-off. This value is then used during the next engine cold start to schedule the open-loop air/fuel ratio by using the cold adaptive table values which have been modified by the values stored in the corresponding cells of the offset correction value table.

An advantage of the invention is that it provides improved cold start A/F control thereby reducing undesired emissions while allowing rapid converter warm-up.

BRIEF DESCRIPTION OF THE DRAWINGS

The object and advantages of the claimed invention will become more readily apparent from the following detailed description of an example of operation described with reference to the drawings wherein:

DETAILED DESCRIPTION OF A PREFERRED EMBODIMENT

Figure 1:
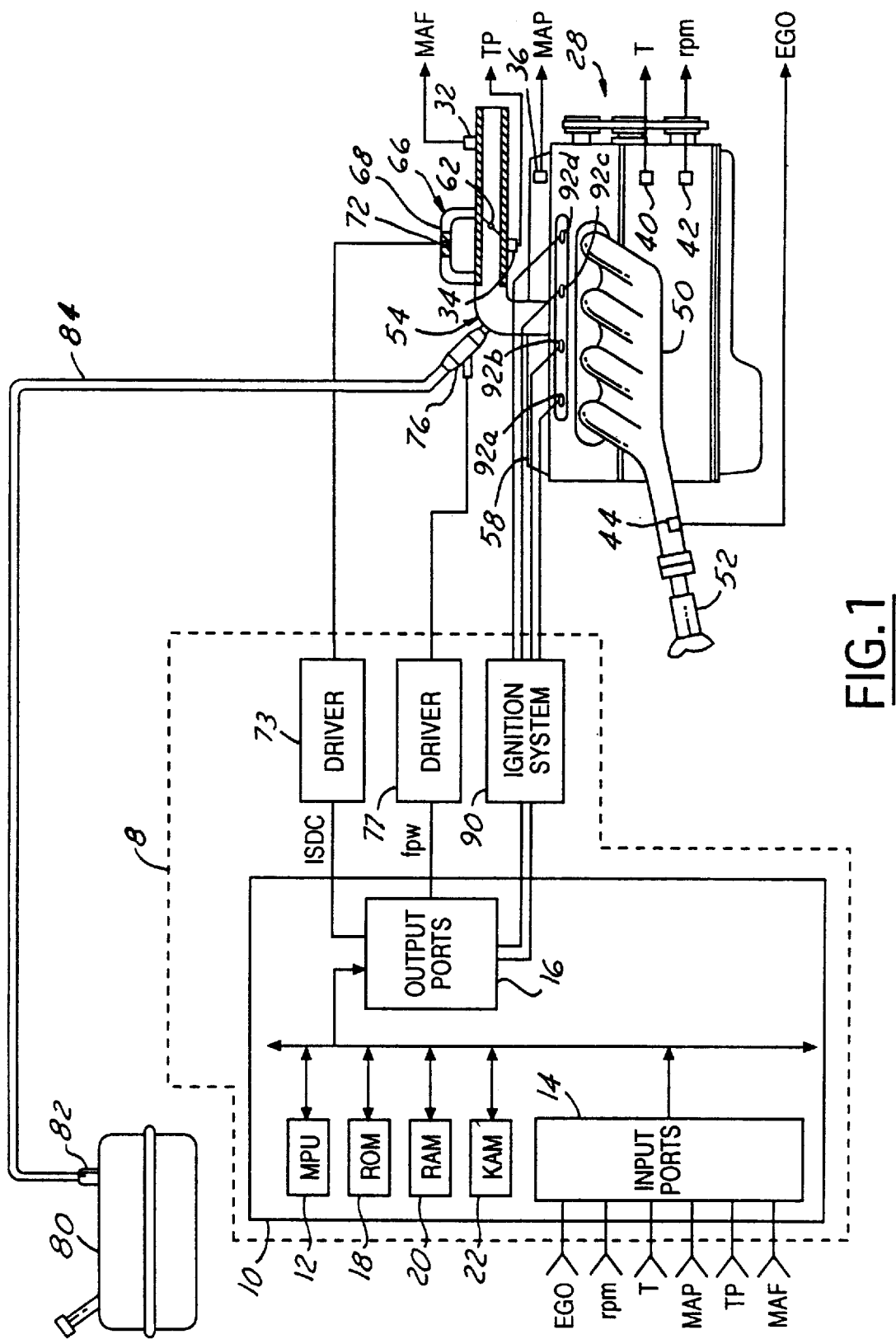
FIG. 1 is a block diagram of an engine control system in accordance with an embodiment of the present invention.

Turning first to FIG. 1, controller 8 is shown including conventional microcomputer 10 having: microprocessor unit 12; input ports 14; output ports 16; read only memory 18, for storing control programs; random access memory 20, for temporary data storage which may also be used for counters or timers; keep-alive memory 22, for storing learned values; and a conventional data bus. As described in greater detail later herein, controller 8 controls operation of engine 28 by the following control signals; pulsewidth signal fpw for controlling liquid fuel delivery via drivers 77; idle speed duty cycle signal ISDC for controlling engine idle speed via drivers 73; and conventional distributorless ignition system 90 for providing ignition current to spark plugs 92a–d.

Controller 8 is shown receiving various signals from conventional engine sensors coupled to engine 28 including: measurement of inducted mass airflow (MAF) from mass airflow sensor 32; indication of primary throttle position (TP) from throttle position sensor 34; manifold absolute pressure (MAP), commonly used as an indication of engine load, from pressure sensor 36; engine coolant temperature (T) from temperature sensor 40; indication of engine speed (rpm) from tachometer 42; and output signal EGO from exhaust gas oxygen sensor 44 which, in this particular example, provides an indication of whether exhaust gases are either rich or lean of stoichiometric combustion.

In this particular example, engine 28 is shown having EGO sensor 44 coupled to exhaust manifold 50 upstream of conventional catalytic converter 52. Intake manifold 58 of engine 28 is shown coupled to throttle body 54 having primary throttle plate 62 positioned therein. Bypass throttling device 66 is shown coupled to throttle body 54 and includes; bypass conduit 68 connected for bypassing primary throttle plate 62; and solenoid valve 72 for throttling conduit 68 in proportion to the duty cycle of idle speed duty cycle signal (ISDC) from controller 8. Throttle body 54 is also shown having fuel injector 76 coupled thereto for delivering liquid fuel in proportion to the pulse width of signal fpw from controller 8. Fuel is delivered to fuel injector 76 by a conventional fuel system including fuel tank 80, fuel pump 82, and fuel rail 84.

Figure 2A:
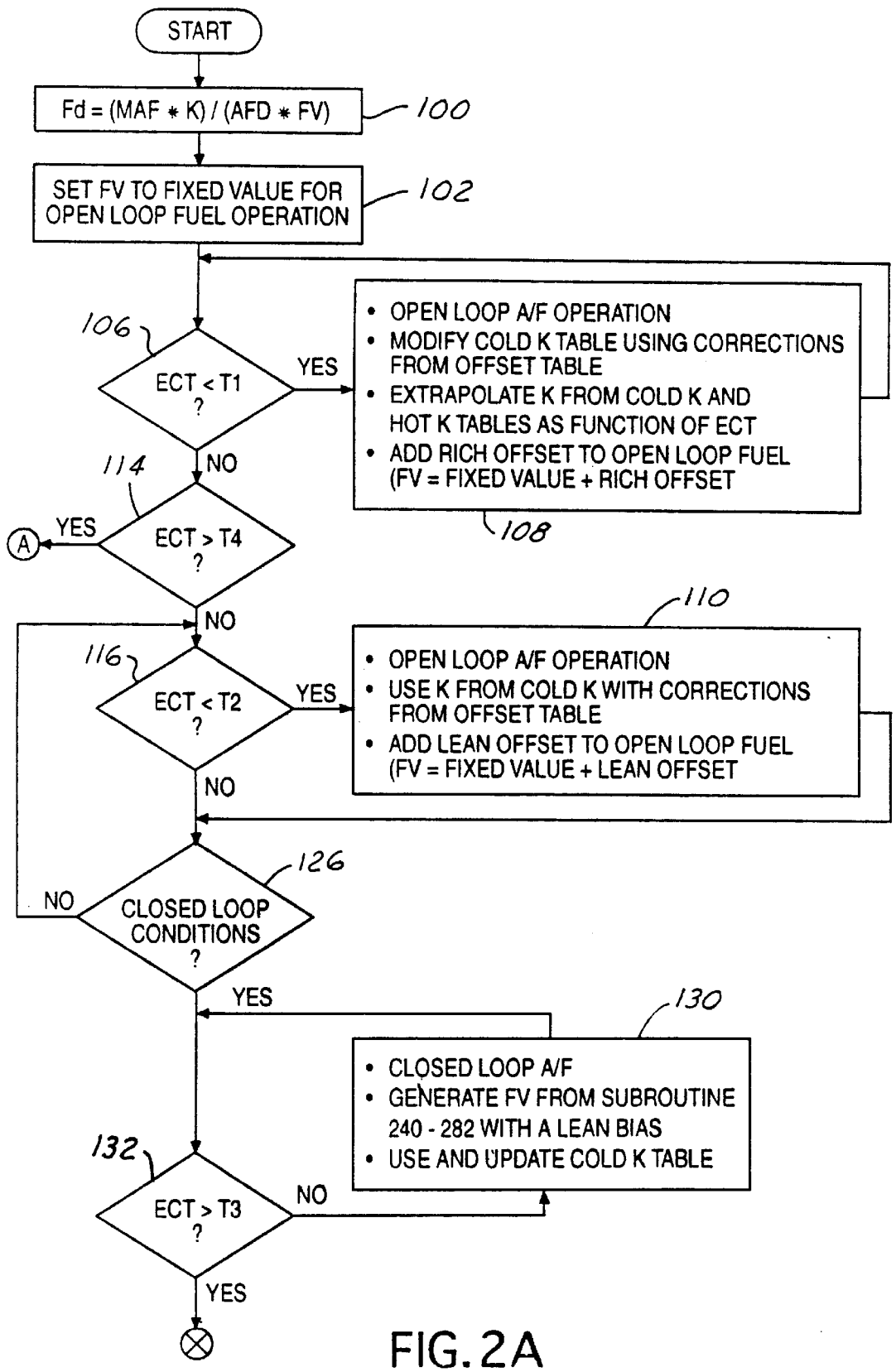
FIGS. 2A–2B, 3 and 4 are flow charts of various operations performed by portions of the embodiment shown in FIG. 1.
Figure 2B:
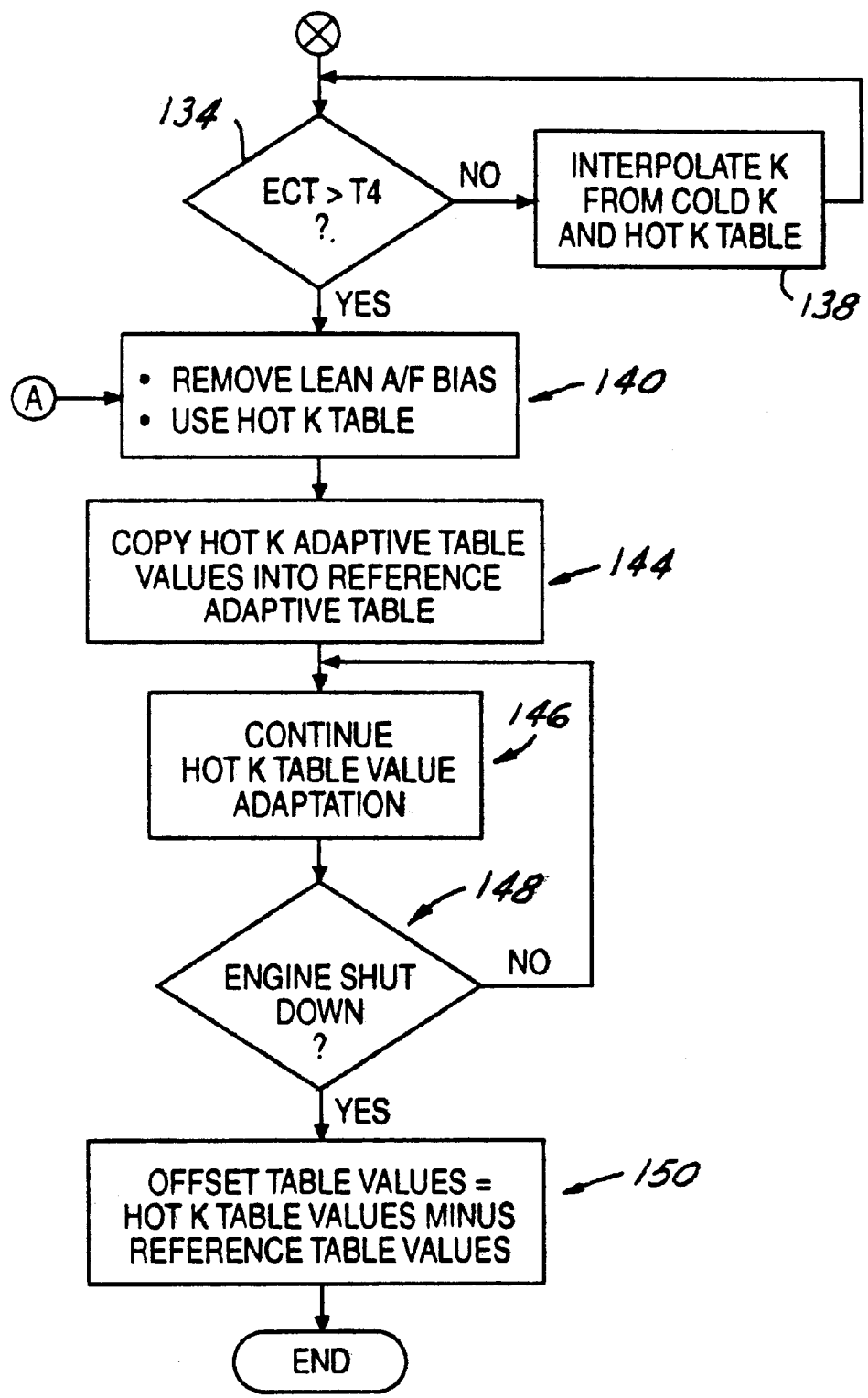

A description of various air/fuel operations performed by controller 8 is now commenced with initial reference to the flow charts shown in FIGS. 2A–2B. During step 100, the fuel command (shown as desired fuel quantity Fd) is calculated by dividing the product of desired air/fuel ratio AFD times feedback variable FV into the product of inducted mass flow measurement MAF times correction value K. In this particular example, desired air/fuel ratio AFD is the stoichiometric value of the fuel blend used which is typically 14.3 pounds of air per pound of fuel for a low emissions fuel blend. Feedback variable FV and correction value K are each generated by the feedback routines, responsive to EGO sensor 44, which are described latter herein with particular reference to respective FIGS. 3 and 4.

Continuing with FIGS. 2A–2B, feedback variable FV is initially set to a fixed value for open loop air/fuel operation (step 102). Stated another way, desired fuel quantity Fd provides an open loop fuel command which is related to signal MAF and is not adjusted by feedback. In this particular example, feedback variable FV is set to unity (1.0) which would correspond to operation at desired air/fuel ratio AFD under ideal operating conditions without any engine component aging. It is well known, however, that this open loop operation may not result in engine air/fuel exactly at stoichiometry. Correction by correction value K, however, will be provided as described below.

Prior to describing the detailed operation of the subroutines of FIGS. 2A and 2B, the A/F operations as a function of the ECT will be summarized. The engine operating temperature is divided into four temperatures, T1–T4, providing five regions. Below T1 is the sub-cold region of engine operation. In this region, the A/F control operates in open-loop and extrapolates between the hot and cold adaptive tables to provide a rich offset. Between T1 and T2 is the cold region. Again, A/F control is open-loop and the cold adaptive table is used with a lean offset. The region between T2 and T3 lies between the warmed-up and cold engine operating region. A/F control is closed-loop and the cold adaptive table is used and updated. The region between T3 and T4 also lies between the warmed-up and cold engine operating region. A/F control is closed-loop with interpolated values from the hot and cold adaptive tables. The region above T4 is the warmed-up engine operating region. A/F control occurs under normal closed-loop control using the hot adaptive table which is also being updated.

Referring again to FIG. 2A, when engine coolant temperature ECT is less than predetermined temperature T1 (step 106), engine temperature is too low to enter the subroutine for converter warm-up. The subroutine described with reference to step 108 is then entered to minimize the time required to start and reliably warm-up engine 28. In step 108, A/F control is open-loop. Various sub steps are then performed. The cold adaptive table (cold K) is modified using corrections from the offset table stored in microcomputer 10. Open loop air/fuel operation proceeds by adding a rich offset to desired fuel quantity Fd. In this particular example, feedback variable FV is set to a fixed value less than unity. Correction value K is then extrapolated from two tables stored in microcomputer 10 which store correction K for cold engine operation and hot engine operation, respectively. In this example, the extrapolation occurs as a function of engine coolant temperature ECT.

In the event engine coolant temperature ECT is greater than temperature T1 (step 106), it is compared to temperature T4 (step 114) which is associated with hot engine operation and normal A/F control. If engine coolant temperature ECT is less than temperature T4, it is compared to temperature T2 (step 116). When ECT is less than temperature T2, the engine is operating in the cold region. A predetermined lean offset is then imposed on desired fuel quantity Fd (step 110). Stated another way, open loop fuel control continues with a lean offset imposed on the open loop fuel quantity commanded so that the exhaust air/fuel ratio is lean of stoichiometry by a preselected amount. In this particular example, the lean offset is provided by setting feedback variable FV to a fixed value and increasing this fixed value by a predetermined amount correlated with the desired lean offset as a function of ECT (step 110). Further, correction value K is read from the table of microcomputer 10 storing cold correction values for a plurality of engine speed and load cells. As described later herein, each correction value K is subsequently generated from closed loop air/fuel feedback control. Also, each correction value K advantageously corrects any error between the open loop lean offset provided by the open loop fuel command and the desired lean shift in air/fuel ratio from stoichiometry.

The above-described open loop air/fuel operation continues until closed loop conditions are detected in step 126. In this particular example, closed loop air/fuel control is commenced when engine coolant temperature ECT is above a predetermined value, and a readiness check such as temperature of EGO sensor 44 is satisfied. When closed loop air/fuel control is commenced (step 130), feedback variable FV is no longer set to a fixed value plus a lean offset, but is generated in response to EGO sensor 44 as described later herein with particular reference to steps 240–282 of the subroutine shown in FIG. 3. As further described in steps 240–282, feedback variable FV is generated with a lean bias so that engine air/fuel operation will average to a value offset from stoichiometry in the lean direction by a preselected amount. To more closely align the average air/fuel ratio with the preselected lean air/fuel ratio, desired fuel quantity Fd is further corrected by a correction value K for each engine speed load operating range (step 130) provided ECT is not greater than T3 (step 132). And, as described later herein with particular reference to FIG. 4, each correction value K is adaptively learned. The closed loop operation described above with reference to step 130 continues until engine coolant temperature ECT is greater than predetermined temperature T3 (step 132). If engine coolant temperature ECT is greater than temperature T3, but less than temperature T4 (step 134), each correction value K is interpolated from the cold K and hot K tables stored in microcomputer 10 for each engine speed load range (step 138). Other than selection of correction value K, closed loop operation continues as previously described above with particular reference to step 130.

In the event engine coolant temperature ECT is greater than temperature T4 (step 134), each correction value K is selected from the hot K tables of microcomputer 10 (step 140). In addition, a lean air/fuel bias is removed from feedback FV (step 140). Normal air/fuel feedback control is thereby commenced in step 140.

The hot K adaptive table is used in step 140 for a suitable period of time and, thereafter, the A/F correction values stored in the hot K table are copied and stored to a reference K table (step 144). If the engine is shut off prior to the end of the updating time period associated with the hot K table, the last updated correction values are copied and stored into the reference K table. The engine then enters steady state operation wherein the hot adaptive table is continuously updated in the normal manner (step 146).

During this time, if the engine is shut off (step 148) and then restarted (i.e., not a cold start), the hot K table is continued to be updated in the normal manner assuming the ECT is above the correct temperature. Each time the engine is cycled off, however, a comparison is made of the values stored in the corresponding cells of the hot K table and the reference K table. The difference is stored in another table called the "offset" table (step 150). The values stored in the offset table thus represent changes which occur from the time the engine initially warms up, to when the engine is turned off.

The air/fuel feedback subroutine executed by controller 8 to generate fuel feedback variable FV is now described with reference to the flowchart shown in FIG. 3. A determination is first made that closed loop (i.e., feedback) air/fuel control is desired in step 240 in the same manner as previously described herein with reference to step 126 in FIGS. 2A–2B. Next, the subroutine determines whether feedback variable FV should be biased in step 244. In the event bias is not required, integral term $\Delta i$ is set equal to integral term $\Delta j$, and proportional term Pi is set equal to proportional term Pj (step 246). Thus, the integration and proportional steps of the PI controller described above are set equal so that the resulting feedback variable FV has no bias.

On the other hand, when a bias is required (step 244), the integral and proportional terms are selected to provide the desired bias (step, 248). For example, in the event a lean bias is required as provided in previously described step 130 in FIGS. 2A–2B, proportional term Pi is made greater than proportional term Pj and/or integral term $\Delta i$ is made greater than integral term $\Delta j$ by a percentage necessary to achieve the desired bias. Stated another way, when the integral and proportional terms in the lean (i) direction and rich (j) direction are made equal, feedback variable FV will average to unity. Thus, the engine air/fuel ratio achieves an average at desired air/fuel ratio AFD. On the other hand, when the integral and proportional terms in the lean (i) direction are made greater than in the rich (j) direction, feedback variable FV will average to a value greater than unity by an amount determined by these terms. Thus, a desired lean bias in the air/fuel ratio is achieved.

Figure 3:
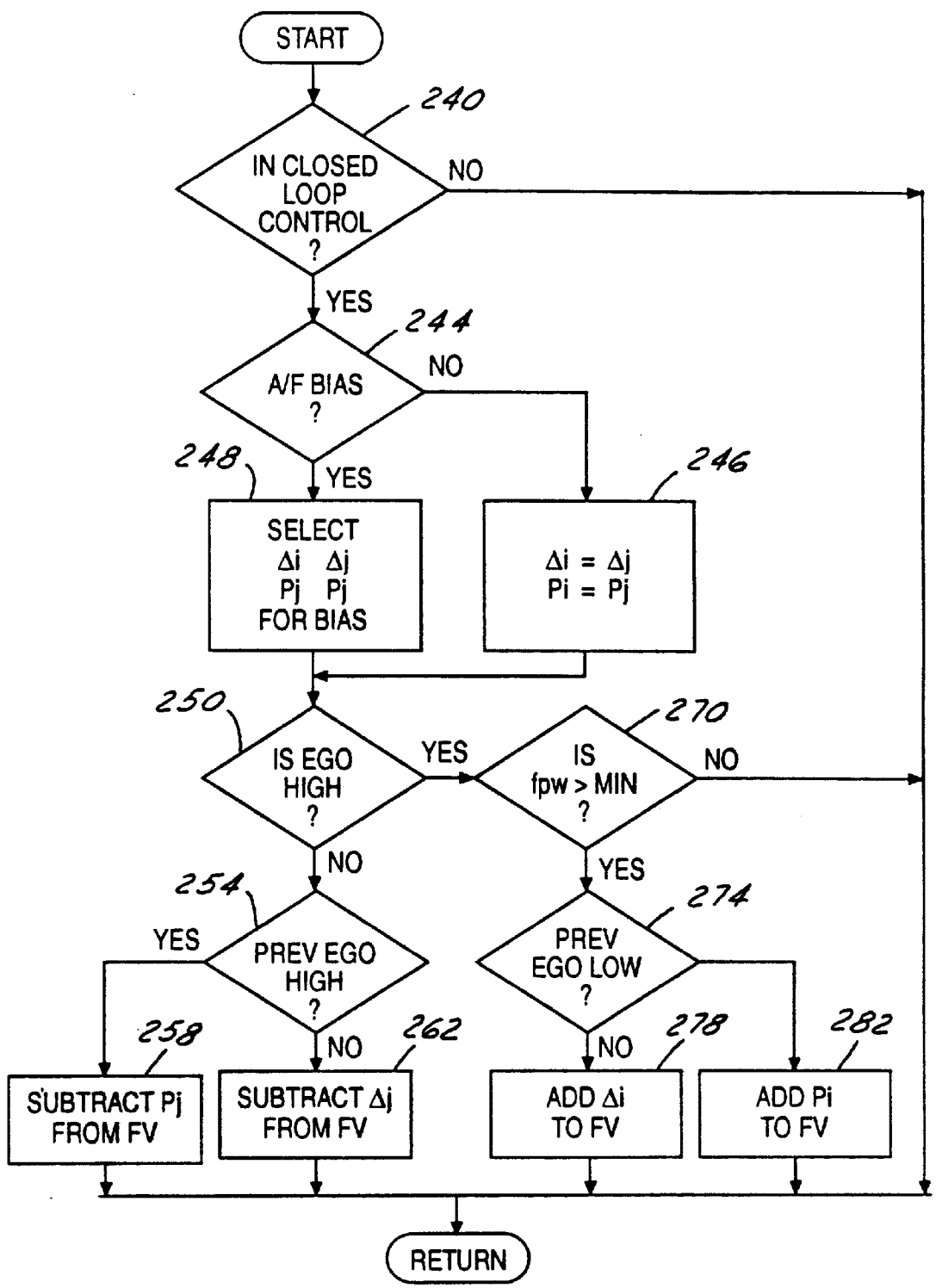

The specific manner in which the proportional and integral terms generate feedback variable FV is now described with respect to steps 250–282 of the subroutine shown in FIG. 3. EGO sensor 44 is sampled in step 250 during each background loop of controller 8. When EGO sensor 44 is low (i.e., lean), but was high (i.e., rich) during the previous background loop (step 254), proportional term Pj is subtracted from signal FV in step 258. When EGO sensor 44 is low, and was also low during the previous background loop, integral term $\Delta j$ is subtracted from signal FV in step 262. Accordingly, in this particular example of operation, proportional term Pj represents a predetermined rich correction which is applied when EGO sensor 44 switches from rich to lean. Integral term $\Delta j$ represents an integration step to provide continuously increasing rich fuel delivery when EGO sensor 44 continues to indicate combustion lean of stoichiometry.

When fpm is greater than a minimum value MIN (step 270) and when EGO sensor 44 is high but was low during the previous background loop (step 274), proportional term Pi is added to signal FV in step 282. When EGO sensor 44 is high, and was also high during the previous background loop, integral term $\Delta i$ is added to signal FV in step 278. Proportional term Pi represents a proportional correction in a direction to decrease fuel delivery when EGO sensor 44 switches from lean to rich. Integral term $\Delta i$ represents an integration step in a fuel decreasing direction while EGO sensor 44 continues to indicate combustion rich of stoichiometry.

Figure 4:
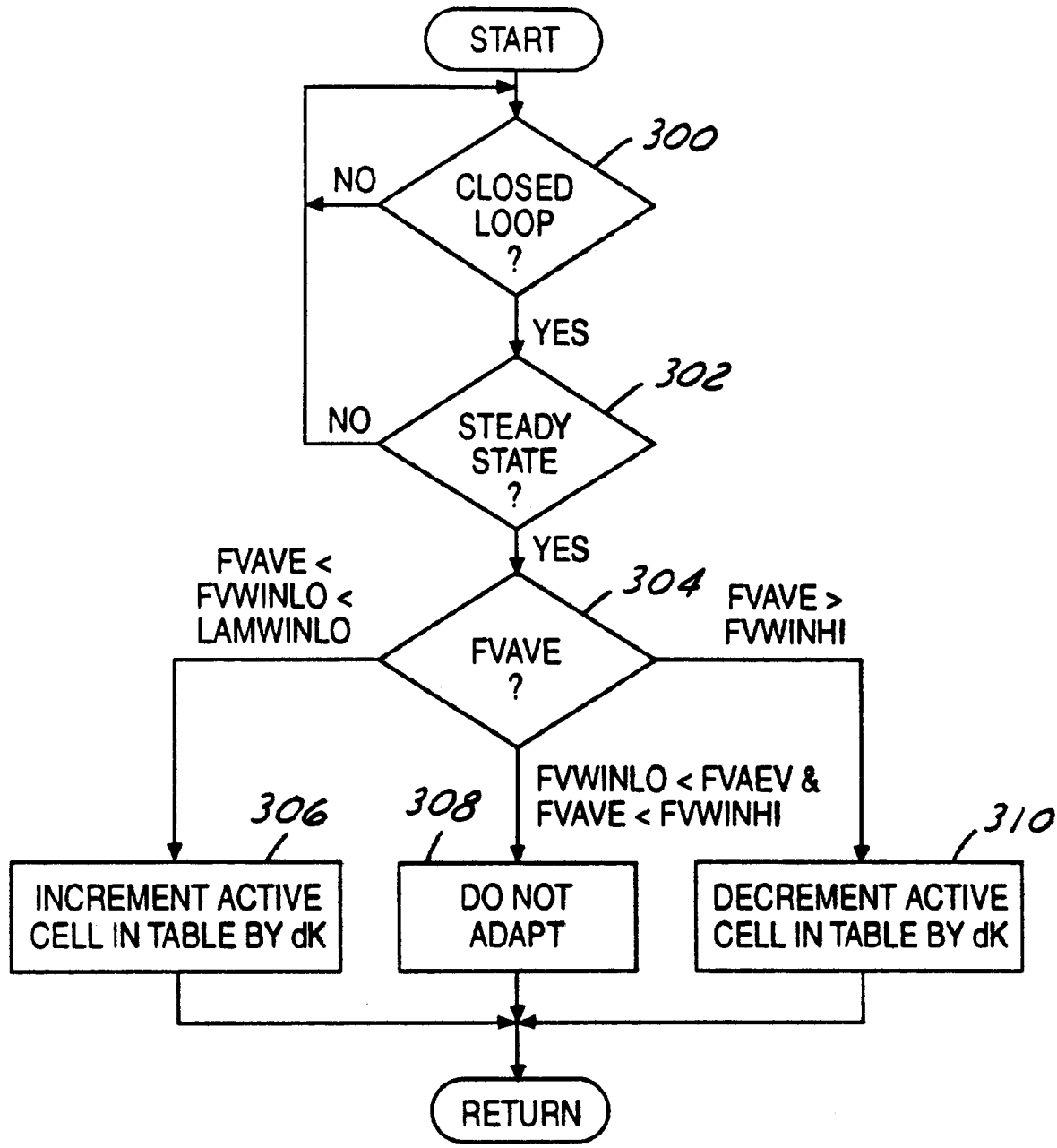

The adaptive learning subroutine for learning correction value K during both cold engine and hot engine operation is now described with reference to the flowchart shown in FIG. 4. Operation for entering closed loop air/fuel control is first determined in step 300 in a similar manner to that previously described with reference to step 126 in FIGS. 2A–2B. The engine is checked at step 302 to determine if it is operating in steady state. Steady state operation is defined by having the engine load and transient fuel meet predetermined variability requirements. The hot and cold A/F control tables corresponding to the ECT are updated when the steady state conditions are met.

The tables are updated by comparing the average feedback variable (FVAVE) in step 304 with a desired operating region defined by FVWINLO and FVWINHI. If the average feedback variable is less than FVWINLO, then the corresponding speed/load cell in the adaptive K table is incremented by $\Delta K$ (step 306). If FVAVE is greater than the desired range, then the corresponding speed/load cell in the adaptive K table is decremented by $\Delta K$ (step 310). Otherwise, no action is taken (step 308).

The subroutine described above with respect to FIG. 4 provides an adaptive learning of the difference or error between actual engine air/fuel operation and the desired air/fuel ratio. It is also operable when the desired air/fuel ratio is offset from stoichiometry by a preselected offset.

Although one example of an embodiment which practices the invention has been described herein, there are numerous other examples which could also be described. For example, analog devices, or discreet IC's may be used to advantage rather than a microcomputer. Further, proportional rather than two-state exhaust gas oxygen sensors may be used to advantage. The invention is therefore to be defined only in accordance with the following claims.

What is claimed is:

1. A control method for an internal combustion engine having its exhaust coupled to a catalytic converter, comprising the steps of:

generating a fuel command for delivering fuel to the engine based upon at least an amount of air inducted into the engine;

detecting engine operation in a first region corresponding to a warmed-up engine state;

adaptively learning a correction value upon entering said first region in response to a feedback variable derived from an exhaust gas oxygen sensor;

storing said correction value as a reference correction value; thereafter continuously adaptively learning said correction value during operation in said first region in response to said feedback variable derived from said exhaust gas oxygen sensor; and upon engine shut-off, storing the difference between said correction value and said reference correction value as an offset correction value such that said offset correction value represents changes in engine operating characteristics from the time period between initial engine warm-up and engine shut-off.

2. The method recited in claim 1 wherein said step of adaptively learning said correction value comprises steps of adaptively learning a plurality of correction values for a corresponding plurality of engine speed/load ranges and storing each of said correction values in a correction table.

3. The method recited in claim 2 wherein the step of storing said correction value as a reference correction value comprises the steps of storing each of said correction values in a reference table.

4. The method recited in claim 3 wherein the step of storing the difference between said correction value and said reference value comprises storing the difference between said correction table and said reference table as an offset correction table.

5. A control method for an internal combustion engine having its exhaust coupled to a catalytic converter, comprising the steps of:

generating a fuel command for delivering fuel to the engine based upon at least an amount of air inducted into the engine;

offsetting said fuel command by a predetermined amount in a lean direction during a period after engine start corresponding to cold engine operation to shift engine exhaust gas mixture towards a preselected air/fuel ratio lean of stoichiometry by a preselected amount;

correcting said offset fuel command by a correction value such that said exhaust gas mixture is shifted more closely to said preselected air/fuel ratio, said correction value being modified as a function of an offset correction value wherein said offset correction value represents changes in engine operating characteristics from a time period between initial engine warm-up and engine shut-off.

6. The method recited in claim 5 wherein said fuel command offset is removed upon termination of said period.

7. A control system for an internal combustion engine having its exhaust coupled to a catalytic converter, comprising:

an exhaust gas oxygen sensor coupled to the engine exhaust;

a controller generating a fuel command for delivering fuel to the engine based upon at least an amount of air inducted into the engine, said controller offsetting said fuel command by a predetermined amount in a lean direction during a period after engine start corresponding to cold engine operation to shift engine exhaust gas mixture towards a preselected air/fuel ratio lean of stoichiometry by a preselected amount, said controller correcting said offset fuel command by a correction value such that said exhaust gas mixture is shifted more closely to said preselected air/fuel ratio, said correction value being modified as a function of an offset correction value wherein said offset correction value represents changes in engine operating characteristics from a time period between initial engine warm-up and engine shut-off; and feedback means for adjusting said fuel command in response to said feedback signal to maintain said exhaust gas mixture at said preselected air/fuel ratio.

* * * * *